United States Patent Office 2,950,296
Patented Aug. 23, 1960

2,950,296
SUBSTITUTED BENZENESULFONYL-HYDRAZONES (L)

Hans Willi Zimmer, Cincinnati, Ohio, assignor to The Chattanooga Medicine Company, Chattanooga, Tenn., a corporation of Tennessee No Drawing. Filed July 1, 1958, Ser. No. 745,833

3 Claims. (Cl. 260—397.7)

The instant invention relates to novel organic compounds, and more particularly, to novel substituted benzenesulfonylhydrazones.

Although the compounds of the invention may have a number of uses in various fields, they may be found to be particularly useful as sun screen agents, foaming agents and chemotherapeutic agents. A desirable ingredient for "sun tan" lotions is a sun screen agent with high absorption of ultra-violet radiation in the neighborhood of 2970 A. (which wavelength produces undesirable reddening effect on the skin) and low absorption of light radiation in the neighborhood of 3400 A. (which wavelength produces the maximum tanning effect). The instant compounds possess such absorption spectral characteristics.

Also, the instant compounds may undergo decomposition upon melting and such decomposition is accompanied by the evolution of a large volume of gas, so that these compounds may be added to molten plastic or synthetic resin materials to act as foaming agents therefor.

In addition, the compounds of the invention may display anti-bacterial activity comparable to that of the well known sulfa drugs, sulfanilamide and sulfadiazine. In this respect, it should be noted that certain bacteria such as *Streptococcus pyogenes*, *Micrococcus pyogenes*, and *Escherichia coli* tend to become resistant to the known sulfa drugs, although they may be particularly sensitive to a new sulfa compound. It is believed that exposure of such bacteria to known sulfa drugs often tends to result in the survival of a strain resistant to such sulfa drugs, but still sensitive to a new sulfa drug to which the strain has not yet been exposed. There is thus a great need for new compounds which display anti-bacterial activity.

It is, therefore, an important object of the instant invention to provide new and useful substituted benzenesulfonylhydrazones.

It is another object of the instant invention to provide new and useful nitro- or amino-benzenesulfonylhydrazones of certain higher aldehydes or ketones.

Yet another object of the instant invention is to provide new compounds useful as sun screen agents, foaming agents and/or chemotherapeutic agents.

Other and further objects, features and advantages of the present invention will become apparent to those skilled in the art from the following detailed disclosure thereof.

The instant invention consists in a compound having the formula:

Y—⟨⟩—SO₂NHN=R wherein Y is a monovalent radical selected from the class consisting of NO₂— and NH₂— and R is a divalent C₇–C₁₅ aliphatic radical.

As indicated, the radical Y may be —NO₂ or —NH₂, so that the instant compounds are p-nitrobenzenesulfonylhydrazones or p-aminobenzenesulfonylhydrazones of higher aldehydes or ketones.

In each case, these are aldehydes or ketones containing at least seven carbon atoms and preferably not more than about fifteen carbon atoms. They are aliphatic straight chain or branched chain aldehydes or ketones, with saturated or unsaturated hydrocarbon structures. Saturated aldehydes or ketones such as 3-heptanone, n-decanal or the like may be used; or complex unsaturated molecular structures such as those of citral or farnesal may be used.

Typical compounds of the invention include the following:

p-Nitrobenzenesulfonylhydrazone of 3-heptanone:

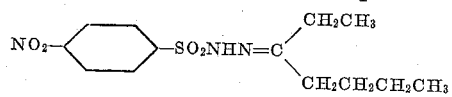

p-Nitrobenzenesulfonylhydrazone of citral:

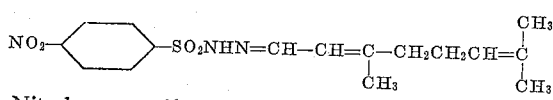

p-Nitrobenzenesulfonylhydrazone of n-decanal:

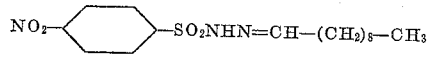

p-Nitrobenzenesulfonylhydrazone of farnesal:

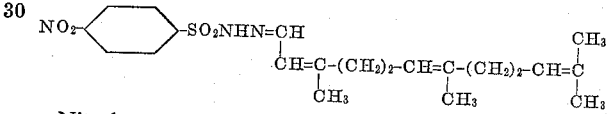

p-Nitrobenzenesulfonylhydrazone of 6-dodecanone:

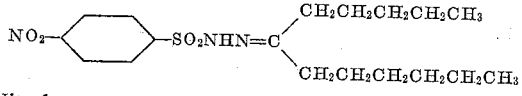

p-Nitrobenzenesulfonylhydrazone of 2-heptanone:

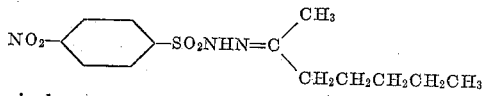

Typical compounds of the invention include the following:

p-Aminobenzenesulfonyl hydrazone of 3-heptanone:

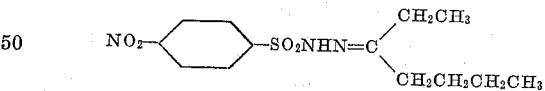

p-Aminobenzenesulfonylhydrazone of 2-heptanone:

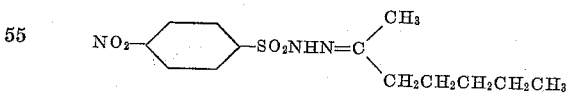

p-Aminobenzenesulfonylhydrazone of citral:

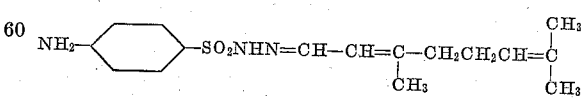

p-Aminobenzenesulfonylhydrazone of n-decanal:

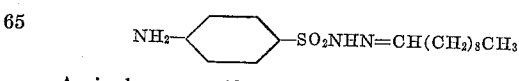

p-Aminobenzenesulfonylhydrazone of 6-dodecanone:

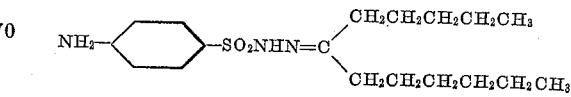

p-Aminobenzenesulfonylhydrazone of farnesal:

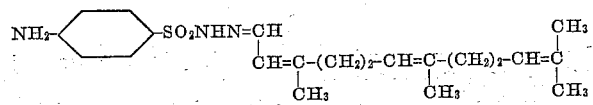

The compounds of the instant invention are prepared by reacting the aldehyde or ketone with p-nitrobenzenesulfonylhydrazine or p-aminobenzenesulfonylhydrazine. The reaction is carried out advantageously in a solvent. The solvents preferably used are water, alcohol, dioxane or mixtures of these. The hydrazines are relatively insoluble in the solvents; and the reaction is facilitated by the application of external heat and stirring. The hydrazine is first placed in the solvent and heat is applied; then substantially an equal molar quantity of the aldehyde or ketone is added, a small amount at a time with stirring, until the reaction is completed, as evidenced by a homogeneous appearance of the reaction mixture. The entire reaction period is but a few minutes (for example, 5 to 10 minutes). The product separates from the reaction mixture on cooling to room temperature and the product may be recrystallized from alcohol, water, dioxane or a mixture thereof, to yield a relatively pure product.

*Example 1* p-Nitrobenzenesulfonylhydrazine (0.025 mol) is slurried, with stirring, in 50 ml. of warm methanol. A charge of 2-heptanone (0.025 mol) is added incrementally with stirring. After the reaction mixture become homogeneous, 20 ml. of water is added. The reaction mixture is allowed to stand overnight and then the crystals which have separated out are collected on a suction filter and dried in an oven at 95° C. The product is a white crystalline material which is recrystallized from 100 milliliters of hot methanol to yield a purified product melting with decomposition at 129–130° C. Analysis of p-nitrobenzenesulfonylhydrazone of 2-heptanone: calculated for $C_{13}H_{19}N_3O_4S$ is C=49.82, H=6.11, N=13.41; and found, C=49.82, H=5.99, N=13.32.

*Example 2*

A procedure is carried out that is the same as that described in Example 1 except that 3-heptanone is used in place of the 2-heptanone and the resulting product is a pale yellow amorphous material melting with decomposition at 99–100.5° C. Analysis for p-nitrobenzenesulfonylhydrazone of 3-heptanone: calculated for $C_{13}H_{19}N_3O_4S$ is C=49.82, H=6.11, N=13.41; and found, C=49.82, H=6.14, N=13.55.

*Example 3*

A procedure is carried out that is the same as that described in Example 1 except that citral is used in place of the 2-heptanone and the resulting product is a yellow amorphous material melting with decomposition at 124–125° C. Analysis for p-nitrobenzenesulfonylhydrazone of citral: calculated for $C_{16}H_{21}N_3O_4S$ is C=54.68, H=6.02, N=11.96; and found, C=54.93, H=6.10, N=12.17.

*Example 4* p-Aminobenzenesulfonylhydrazine (0.027 mol) is dissolved in 100 ml. of hot methanol to which a few drops of water have been added. A charge of 3-heptanone (0.027 mol) is added incrementally with stirring, and the reaction mixture is permitted to cool to room temperature. The crystals precipitated from the reaction mixture upon cooling are collected in a suction filter and dried at 95° C. in an oven. These crystals are recrystallized from hot methanol to which a little water has been added to obtain a white crystalline product melting with decomposition at 155–156° C. Analysis for p-aminobenzene-sulfonylhydrazone of 3-heptanone: calculated for $C_{13}H_{21}N_3O_2S$ is C=55.08, H=7.47, N=14.83; and found, C=55.05, H=7.67, N=14.96.

*Example 5*

A procedure is carried out that is the same as that described in Example 4 except that 2-heptanone is used in place of the 3-heptanone and the resulting product is a white crystalline material melting with decomposition at 167.5–168.5° C. Analysis for p-aminobenzenesulfonylhydrazone of 2-heptanone: calculated for $C_{13}H_{21}N_3O_2S$ is C=55.09, H=7.47, N=14.83; and found, C=54.89, H=7.47, N=14.72.

The p-nitrobenzenesulfonylhydrazones and p-aminobenzenesulfonylhydrazones of the other aldehydes and ketones, such as farnesal, n-decanal, 6-dodecanone, and the like may be prepared by substituting the selected p-aminobenzenesulfonylhydrazine or p-nitrobenzenesulfonylhydrazine for the particular hydrazine set forth in each of the examples and by substituting the selected aldehyde or ketone for the aldehyde or ketone set forth in the examples.

The compounds of the invention just described show peak absorptions of light radiation in the neighborhood of 2970 A. and low absorption of light radiation in the neighborhood of 3400 A., so that they may be used in sun tan lotions. These compounds also undergo decomposition upon melting so that they may be used as foaming agents. In addition, p-aminobenzenesulfonylhydrazone of 3-heptanone shows unusual anti-bacterial activity with respect to *Streptococcus pyogenes*.

It will be understood that modifications and variations may be effected without departing from the spirit and scope of the novel concepts of the present invention.

I claim as my invention:

1. A compound having the formula:

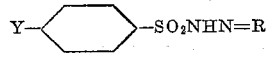

wherein Y is a monovalent radical selected from the class consisting of $NO_2$— and $NH_2$— and R is a divalent $C_7$—$C_{15}$ aliphatic hydrocarbon radical, any unsaturation in such aliphatic radical being olefinic.

2. p-Aminobenzenesulfonylhydrazone of 3-heptanone.
3. p-Nitrobenzenesulfonylhydrazone of citral.

References Cited in the file of this patent

UNITED STATES PATENTS 2,912,445     Zimmer                Nov. 10, 1959

OTHER REFERENCES

Lehmann et al.: Bull. Soc. Chim. Belges, vol. 55, pp. 66 to 67; 83 to 85, 92 and 94 to 95 (1946).

Chemical Abstracts, vol. 41, pp. 5475–5477 (1947). [Abstract of Lehmann et al., Bull. Soc. Chim. Belges, vol. 55, pp. 52–97 (1946).]

Curtius et al.: J. Prakt. Chem., vol. 112, pp. 118–119; 127–128 (1926).